(12) United States Patent
Nikolov et al.

(10) Patent No.: US 9,183,040 B2
(45) Date of Patent: Nov. 10, 2015

(54) METHOD FOR MANIPULATING OBJECTS IN A SOA REGISTRY

(75) Inventors: Dragomir Nikolov, Sofia (BG); Alexander Pankov, Sofia (BG); Jochen Wiedmann, Eningen (DE); Harald Schöning, Dieburg (DE)

(73) Assignee: SOFTWARE AG, Darmstadt (DE)

( * ) Notice: Subject to any disclaimer, the term of this patent is extended or adjusted under 35 U.S.C. 154(b) by 1866 days.

(21) Appl. No.: 12/314,706

(22) Filed: Dec. 15, 2008

(65) Prior Publication Data

US 2010/0094905 A1   Apr. 15, 2010

(30) Foreign Application Priority Data

Sep. 18, 2008   (EP) ..................... 08016448

(51) Int. Cl.
*G06F 9/46*   (2006.01)

(52) U.S. Cl.
CPC .......... *G06F 9/465* (2013.01); *G06F 2209/462* (2013.01)

(58) Field of Classification Search
None
See application file for complete search history.

(56) References Cited

U.S. PATENT DOCUMENTS 7,899,917 B2 *   3/2011   Chitre et al. .................. 709/228

FOREIGN PATENT DOCUMENTS

EP   1 970 802   9/2008

OTHER PUBLICATIONS

Java Web Services Developer Pack (Version 2.0) Combined API Specification, 2005, Oracle, Version 2.0, http://download.oracle.com/docs/cd/E17802_01/webservices/webservices/docs/2.0/api/index.html.*
Java API for XML Registries (JAXR), Apr. 10, 2002, Sun Microsystems, 1.0, 1-119.*
Armstrong et. al, The J2EE 1.4 Tutorial Jun. 17, 2004, Sun Microsystems, pp. i-xxix, 397-442.*
Java Annotations 04, Oracle, http://download.oracle.com/javase/1.5.0/docs/guide/language/annotations.html.*
Shirazi, Java Performance Tuning Sep. 2000, O'Reiley, http://oreilly.com/catalog/javapt/chapter/ch04.html.*
Walsh et al., Discover and Publish Web Services with JAXR, Jun. 14, 2002, JavaWorld, http://www.java2s.com/Article/Java/SOA-Web-Services/Discover_and_publish_Web_services_with_JAXR.htm.*
Gosling et al., The Java Language Specification, Third Edition, 2005, Sun Microsystems, 1-684.*
Getting Started with the Annotation Processing Tool (apt), Copyright 2004, 2010, Oracle (formerly Sun Microsystems), http://download.oracle.com/javase/1,5.0/docs/guide/apt/GettingStarted.html.*
Annotations Sep. 1, 2007, Sun Microsystems, http://web.archive.org/web/20070901022056/http://java.sun.com/docs/books/tutorial/java/javaOO/annotations.html hereinafter JavaAnnotations2.*
"Web Services Made Easier, The Java APIs and Architectures for XML" Sun Microsystems Inc., Oct. 2001 Revision 2; XP-002307219.
"Design Patterns: elelemtns of reusuable object-oriented software passage", Gamma et al., XP-002200550; Jan. 1, 1995; pp. 1-9 and 207-217.
"Model Driven Development of Service-Oriented Grid Applications", Smith et al., Telecommunications, 2005, AICT-ICIW '06 International Conference on Internet and Web Applications.

* cited by examiner

*Primary Examiner* — Jason Liao
(74) *Attorney, Agent, or Firm* — Nixon & Vanderhye P.C.

(57) ABSTRACT

A registry object in a service oriented architecture (SOA) is manipulated by an application. A mapping is defined between a registry object type and an application object type. The application object type is instantiated in the application. The instantiated object facilitates manipulation of the registry via the defined mapping.

13 Claims, 9 Drawing Sheets

METHOD FOR MANIPULATING OBJECTS IN A SOA REGISTRY

Figure 1:
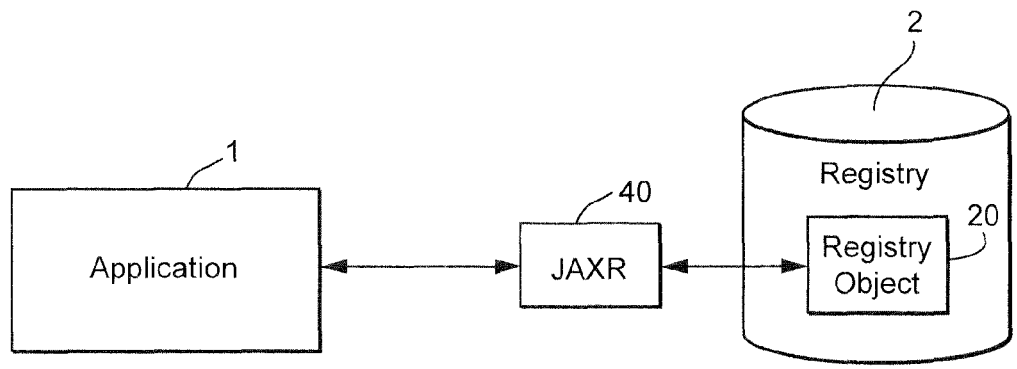

This application claims priority to European Application No. 08016448.6 filed 18 Sep. 2008, the entire contents of which are hereby incorporated by reference.

1. TECHNICAL FIELD

The present invention relates to a method for manipulating objects in a SOA registry.

2. THE PRIOR ART

Modern applications, particularly in the context of Service Oriented Architectures (SOA), often comprise a plurality of independent components which cooperate in order to provide the overall functionality of the application. To this end, SOA registries may be used to publish, discover and utilize such components. A SOA registry is usually a shared resource which stores descriptions of components of a SOA and means for querying the SOA registry for certain components in the sense of "electronic yellow pages". Furthermore, a SOA registry may be able to not only store descriptions of web services commonly used in SOAs, but any kind of component may be described by defining custom types.

In the prior art, there is a number of registry specifications defining the structure and information model of the contents of a SOA registry, e.g. ebXML and UDDI. In order to enable an application to access the contents of a SOA registry, i.e. to publish new components, to look up existing components etc., application programming interfaces (APIs) are known from the prior art, the most popular being the Java API for XML registries (JAXR).

JAXR is a generic API in that it provides access to various kinds of SOA registries, e.g. to SOA registries conforming to the above described specifications. Therefore, JAXR defines an information model which tries to unify the different information models of the different registry specifications.

However, due to the fact that JAXR is generic, the task of programming an application which utilizes JAXR is very complex and requires a detailed understanding of the underlying JAXR information model. E.g. the process of creating a registry object of a certain custom type in the SOA registry may require an application to perform a plurality of steps like creating a generic registry object, creating a custom concept and linking the registry object with the concept by a classification object. Similar steps have to be defined when accessing existing registry objects. These steps typically have to be repeated every time a new registry object is to be created or searched, which is inefficient and error-prone, so that the operation of the programmed application is likely to fail.

In view of the above, it is therefore the technical problem underlying the present invention to improve the access of an application to a SOA registry through JAXR so that the manipulation of the registry objects is more efficient and less error-prone and to thereby at least partly overcome the disadvantages of the prior art.

3. SUMMARY OF THE INVENTION

This problem is according to one embodiment of the invention solved by a method for manipulating at least one registry object of a SOA registry by an application, the at least one registry object being accessible through a Java API for XML registries (JAXR). In the embodiment of claim 1, the method comprises the steps of:

a. defining a mapping between at least one registry object type and at least one application object type, wherein the mapping is described by one or more Java annotations;

b. instantiating the at least one application object type to provide the application with at least one application object corresponding to the at least one registry object; and c. manipulating the at least one application object by the application, the manipulation causing a related manipulation of the corresponding at least one registry object through the JAXR.

Accordingly, a mapping is defined which maps registry object types onto application object types, i.e. application objects (which are instances of application object types) serve as a kind of surrogate for registry objects in the SOA registry (which are instances of registry object types). The mapping is described by one or more Java annotations, which allows for a concise and easy to read mapping definition that is flexibly adaptable, as further outlined in the detailed description below. The mapping is typically a 1:1-mapping, i.e. it maps one application object type onto one corresponding registry object type. However, also 1:n-mappings are possible with the present invention, i.e. one application object type is mapped onto more than one registry object type, or even a m:n-mapping may be defined.

At least one instantiated application object is then provided to the application. A manipulation of the application object by the application results in a related manipulation of the corresponding at least one registry object through the JAXR. This may be achieved in that the application object preferably offers a set of simple operations to the application and internally utilizes the complex JAXR, therefore hiding the specifics of accessing the JAXR from the application.

In one aspect of the invention, the at least one registry object may comprise at least one property and the mapping may comprise a mapping of the at least one property onto at least one property of the corresponding application object.

The JAXR information model may define different notions of properties of registry objects, e.g. object properties, object slots and properties of JAXR-defined object types, which are described in the detailed description below. An application however may comprise different notions of properties, e.g. private attributes accessible through get- and set-operations. Therefore, the JAXR property notions are mapped onto the application property notions. The purpose of this mapping is that when the application manipulates an application object, i.e. by setting the value of a property of an application object, the application object is able to set the corresponding property of the corresponding registry object, e.g. by utilizing the JAXR.

In another aspect of the invention, the at least one property of the at least one registry object may hold at least one string value and the mapping onto the at least one property of the corresponding application object comprises a conversion to a string value.

Certain types of properties in the JAXR information model, e.g. object slots, may be limited to storing values of the type string, i.e. a simple sequence of characters. On the other hand, the application may support a variety of other types such as integers, boolean, date, calendar, etc. Since the values of the application object properties are converted to strings, they can be propagated to the corresponding properties of the registry objects and vice-versa.

In yet another aspect of the invention, the at least one registry object may be related to at least one second registry object by one or more association objects and the at least one application object may be related to at least one second application object by one or more aggregation and/or dependency relationships and the mapping may comprise a mapping of the one or more association objects onto the one or more aggregation and/or dependency relationships.

Furthermore, the at least one registry object may be related to at least one concept of the SOA registry by one or more classification objects and the at least one application object may be related to at least one second application object by one or more aggregation and/or composition relationships and the mapping comprises a mapping of the one or more classification objects onto the one or more aggregation and/or composition relationships.

Additionally or alternatively, the at least one registry object may be related to at least one classification scheme by one or more classification objects, the at least one classification scheme defining at least one taxonomy in the SOA registry and the mapping may comprise a mapping of the at least one registry object onto the corresponding at least one application object.

Furthermore, at least one second registry object may be related to at least one concept by one or more classification objects, the at least one concept being a child concept in the at least one taxonomy. On the other hand, at least one second application object may be related to the at least one application object by an inheritance relationship and the mapping may comprise a mapping of the at least one second registry object onto the at least one second application object.

As can be seen, the JAXR information model may define various notions of relationships between registry objects in the XML registry, e.g. associations, classifications and taxonomies (i.e. classification schemes). These notions may be mapped onto suitable notions of the application domain, e.g. aggregation, composition, dependency and inheritance relationships. The specific JAXR notions, application notions and the mappings are further explained in the detailed description below.

In one aspect of the invention, step b. may comprise the step of creating, in the SOA registry, the at least one registry object corresponding to the at least one application object. Furthermore, step b. may comprise the step of querying the SOA registry for the at least one registry object corresponding to the at least one application object. The two aspects allow the application to create new entries, i.e. new registry objects, in the SOA registry, as well as to search for existing registry objects.

In another aspect of the invention, the definition of the mapping is based on a set of pre-defined mapping rules and the method comprises the further step of defining at least one new mapping rule. As explained above, the method provides mapping rules for mapping the notions of the JAXR information model onto notions of the application. In order to enable an extension of the mapping rules for other notions, new mapping rules may be defined. This ensures that e.g. a custom application can provide its own implementations of mapping rules not originally provided by the method. These custom mapping rules may then be used by the method to process the custom mappings, so that the method is flexibly adaptable to new custom notions and information models.

In a further aspect, the at least one application object is adapted for loading a property or a relationship only when the property or the relationship is accessed by the at least one application. Accordingly, a property or relationship may not be loaded into the application object until it is actually accessed by the application. This is especially advantageous when loading complex application objects with many properties and relationships or application objects with large data, which would normally require much processing power and memory in the application. It is also advantageous for composite registry objects, i.e. objects that comprise other objects.

In a further aspect of the invention, the at least one application object is a Java Bean and the application object type is an interface definition of a Java Bean. Java Beans are special types of Java programs comprising a number of classes and interfaces. The notion of Java Beans is explained in the detailed description below.

Finally, the invention also relates to a computer program comprising instructions for implementing any of the above described methods.

4. SHORT DESCRIPTION OF THE DRAWINGS

Figure 2:
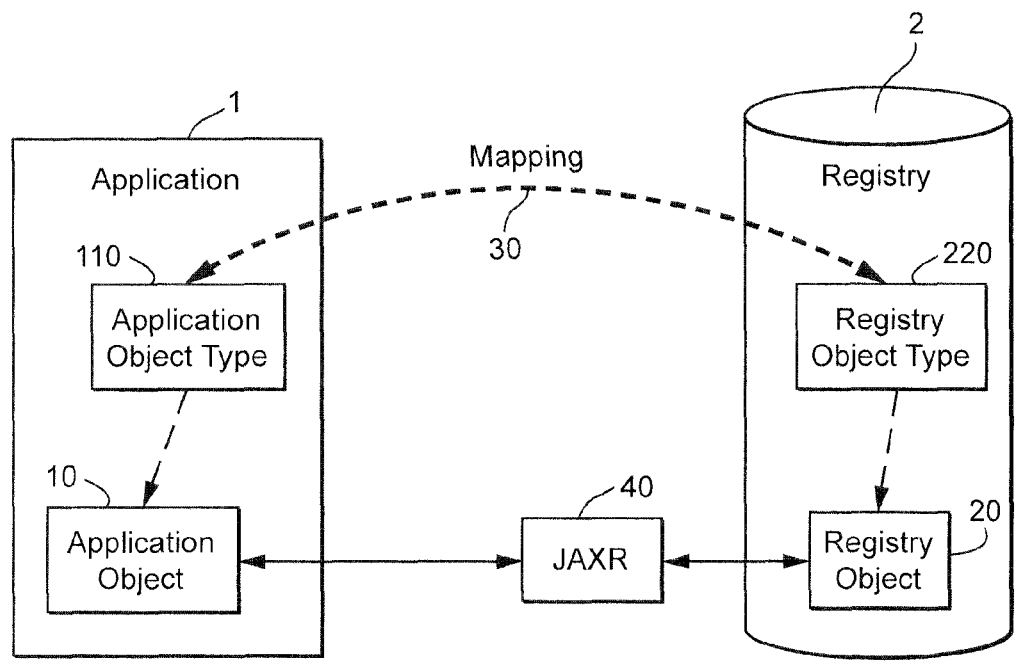
Figure 3:
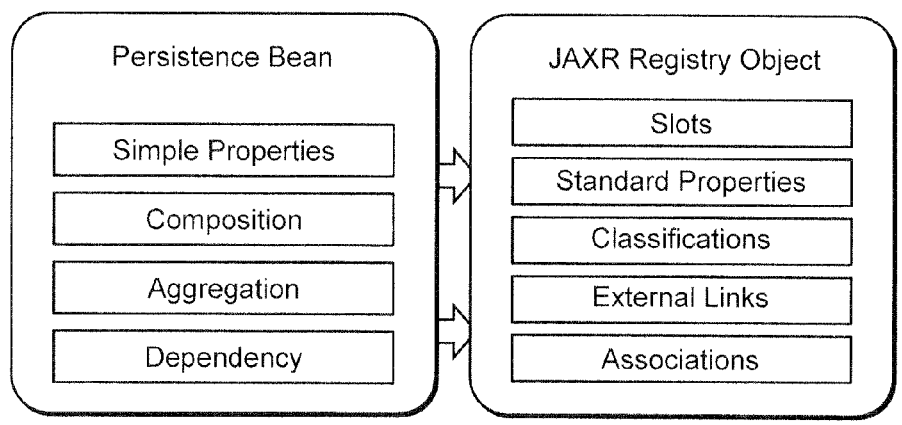
Figure 4:
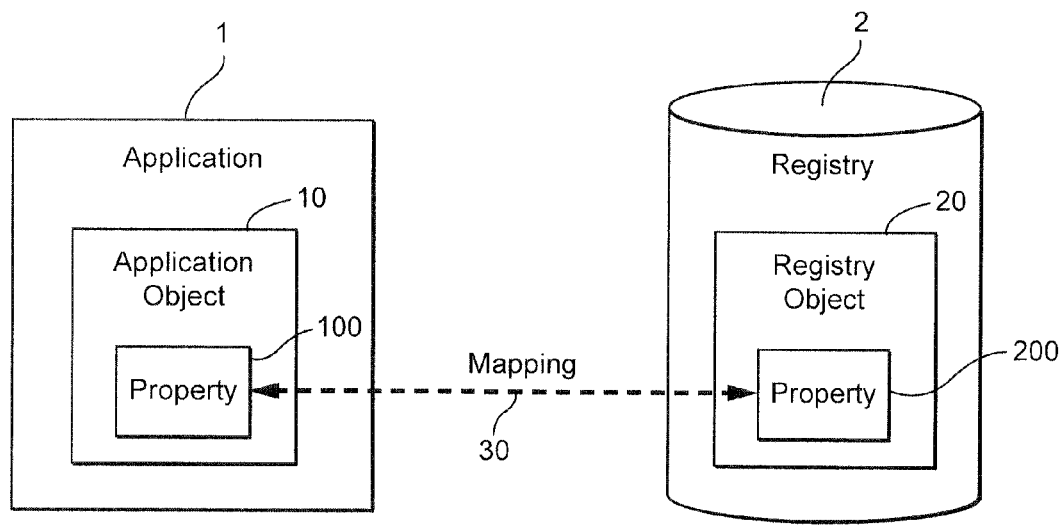
Figure 5:
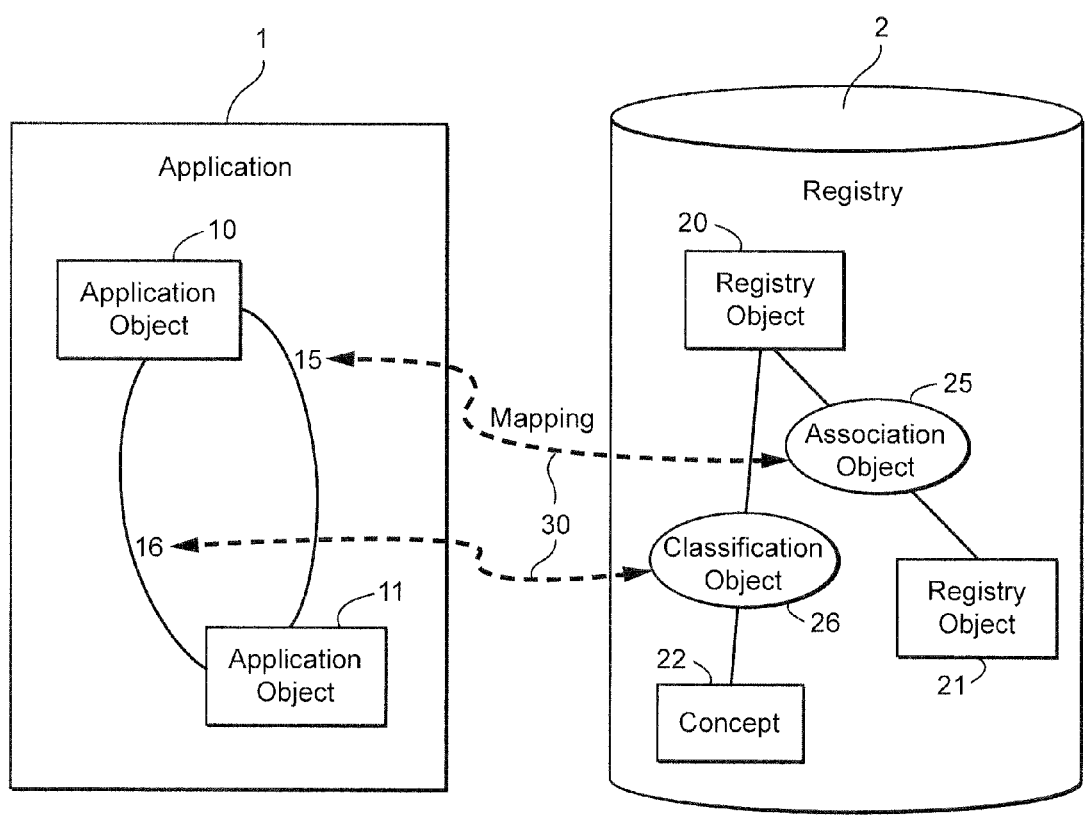
Figure 6:
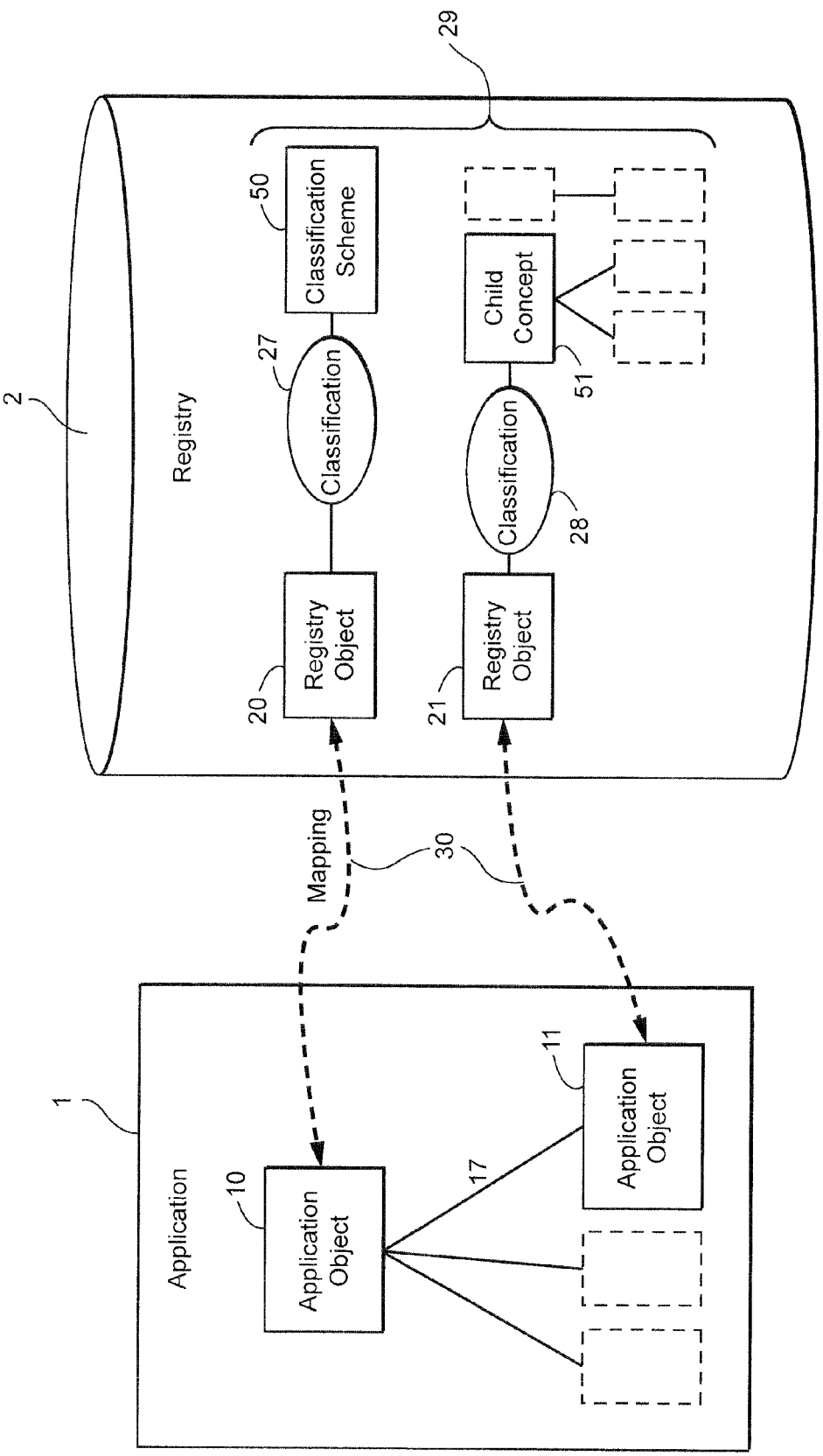
Figure 7:
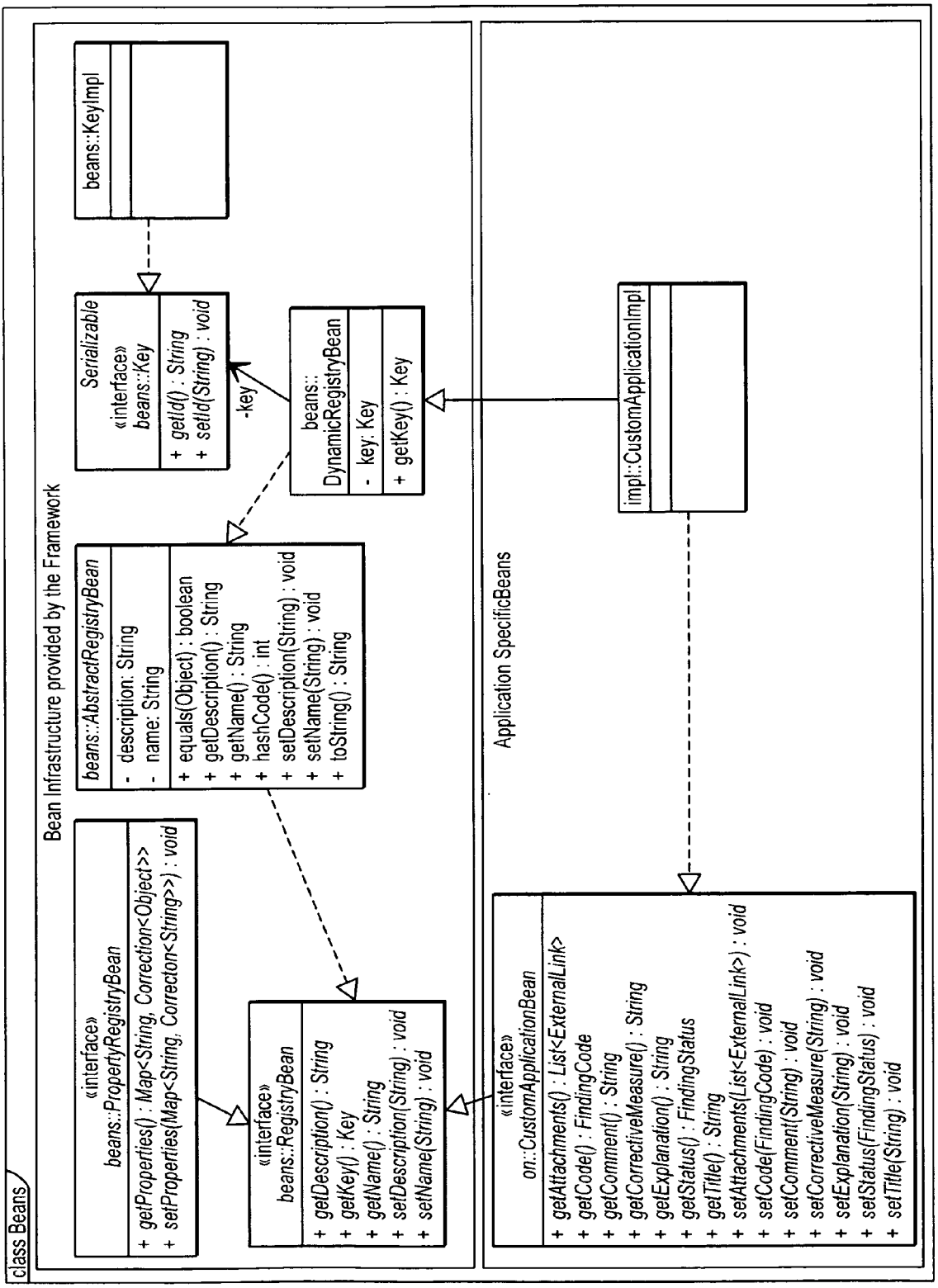
Figure 8A:
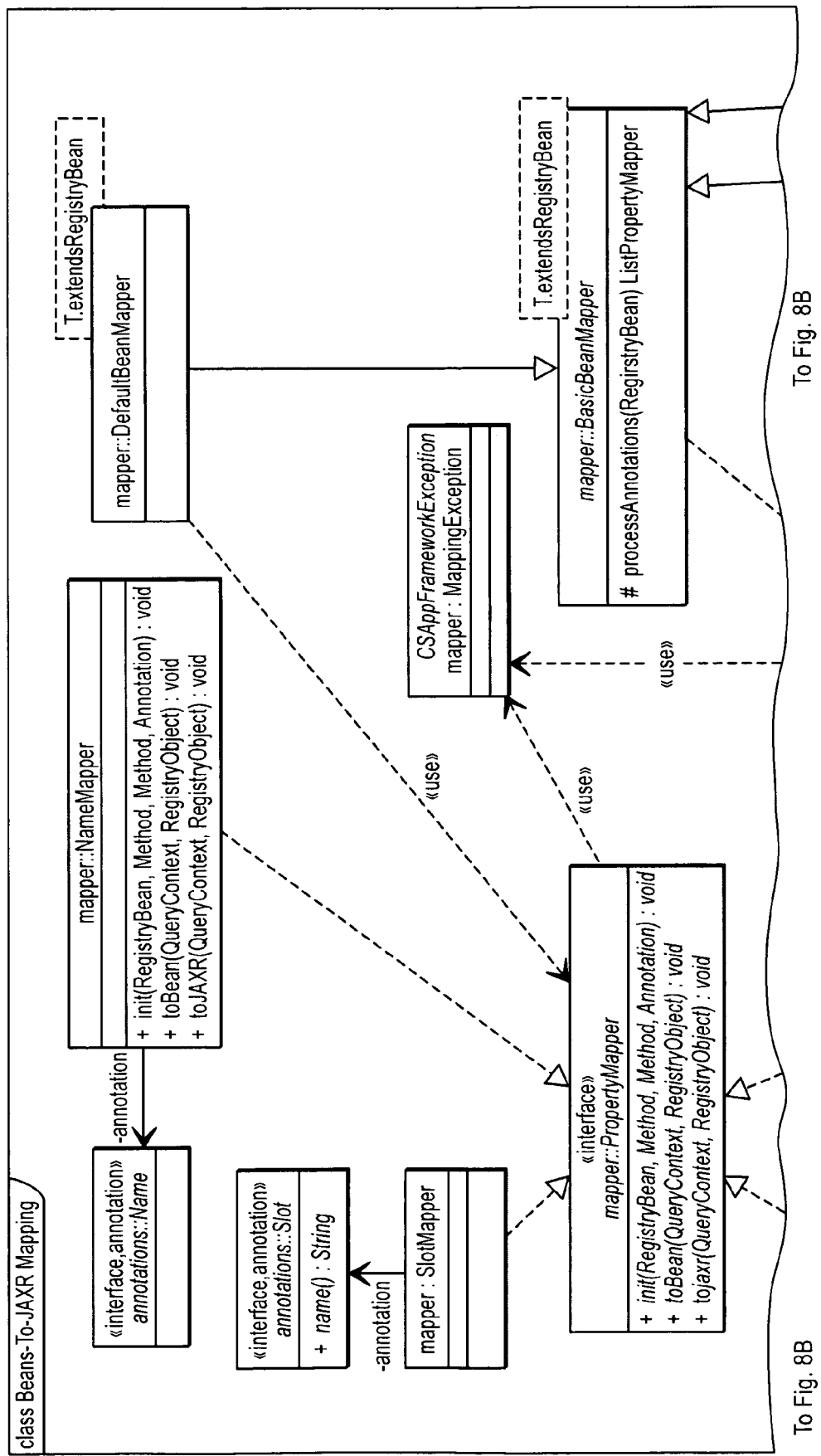
Figure 8B:
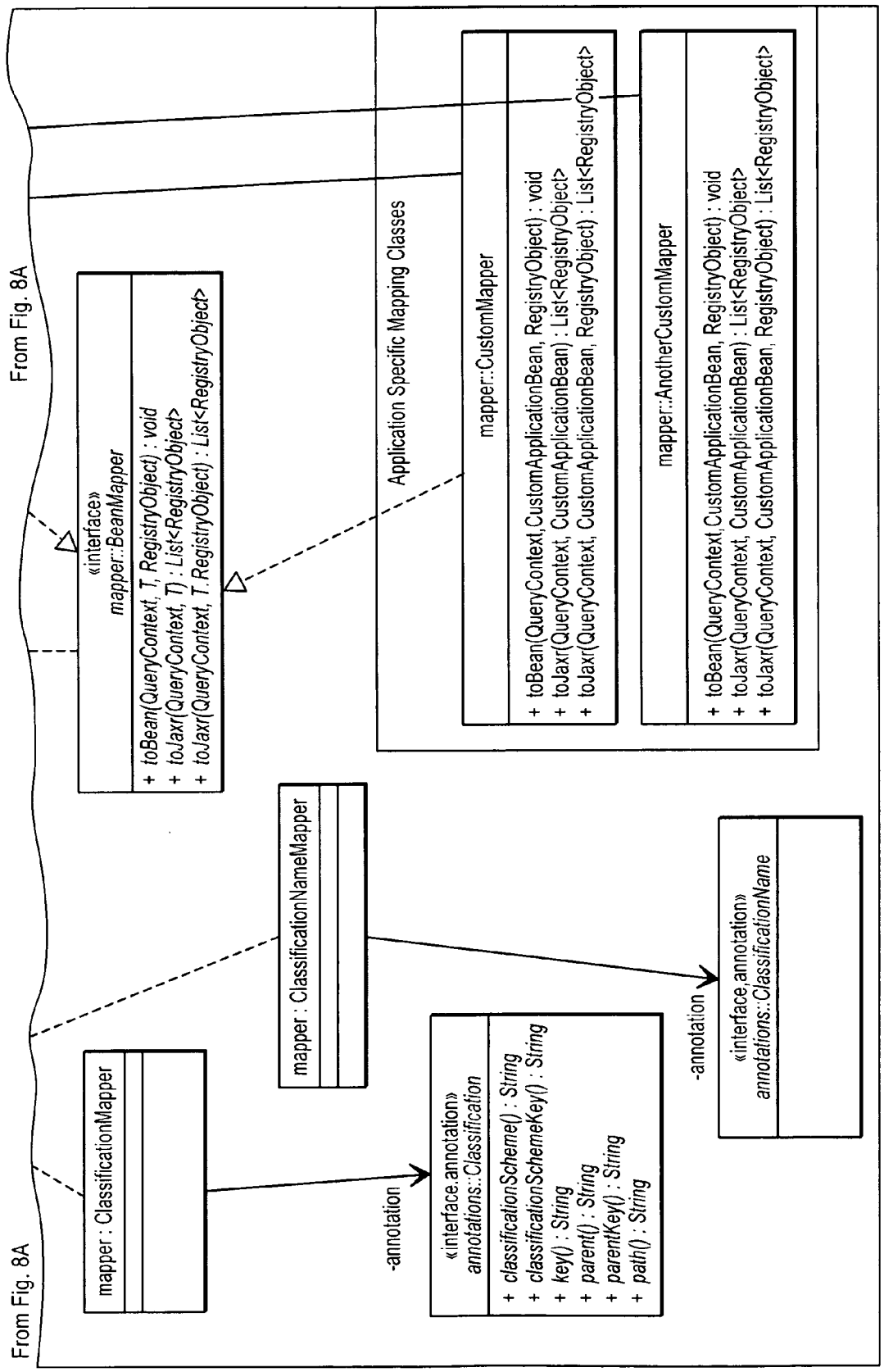
Figure 9:
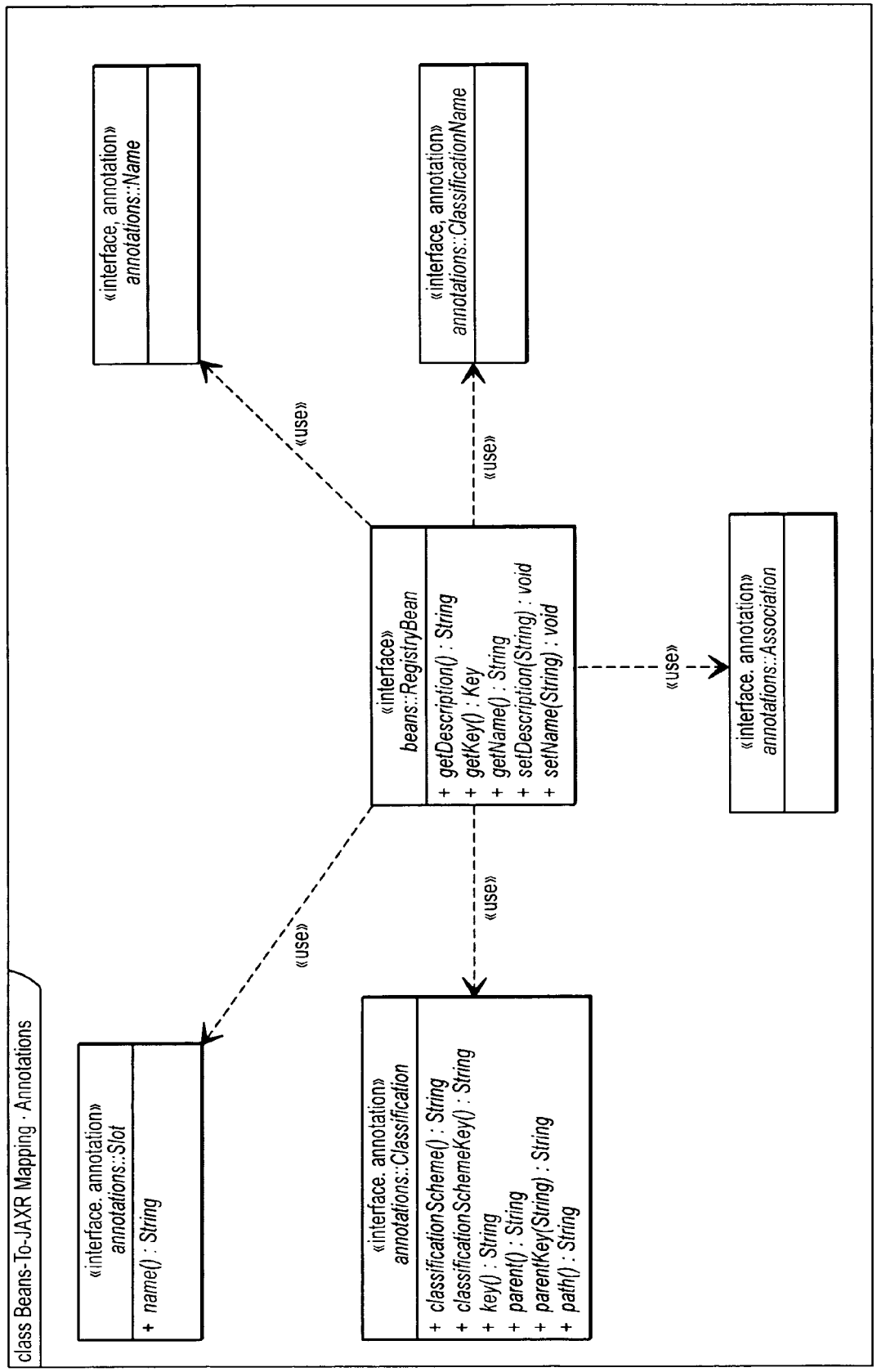

In the following detailed description, presently preferred embodiments of the invention are further described with reference to the following figures:

FIG. 1: A schematic view of an application accessing a SOA registry according to the prior art;

FIG. 2: A schematic view of an embodiment of the present invention;

FIG. 3: An overview of JAXR notions of properties and relationships and corresponding application notions;

FIG. 4: A more detailed view of a mapping between application object properties and registry object properties;

FIG. 5: A more detailed view of a mapping between application object relationships and registry object relationships;

FIG. 6: A more detailed view of a mapping between an application object type hierarchy and a registry object taxonomy;

FIG. 7: A class diagram showing the main types of RegistryBeans;

FIG. 8: A class diagram showing the main types of mapping classes;

FIG. 9: A class diagram showing the main types of annotations of a RegistryBean; and FIG. 10: A sequence diagram showing the creation and update of an exemplary Java bean;

5. DETAILED DESCRIPTION

In the following, a presently preferred embodiment of the invention is described with respect to a scenario as schematically shown in FIG. 2. As can be seen, a SOA registry 2, which may e.g. be an XML registry, comprises a registry object 20. FIG. 2 further shows an application 1 supposed for manipulating the registry object 20 in the SOA registry 2. In the prior art (shown in FIG. 1), the application 1 may directly utilize a Java API for XML registries (JAXR) 40 (as shown by the arrows in FIG. 1). As already described above, the JAXR 40 is an application programming interface (API) for accessing various kinds of SOA registries, e.g. UDDI and ebXML registries, which is very generic and powerful, but has a high level of complexity. The prior art approach shown in FIG. 1 therefore may lead to complex and error-prone application code in the application 1 due to the complexity of the JAXR 40.

In contrast, the method of the present invention as shown in FIG. 2 hides the complexity of the JAXR 40 and allows the application 1 to manipulate the registry object 20 in a more efficient and simple way. This is achieved in that the application 1 is provided with an application object 10, which serves as a kind of surrogate for the registry object 20. A manipulation of the application object 10 by the application 1 results in a related manipulation of the corresponding registry object 20, in that e.g. the application object 10 may utilize the JAXR 40 internally (shown by the horizontal arrows in FIG. 1), thus hiding the complexity of the JAXR 40 from the application 1.

The JAXR 40 defines an information model for the registry objects in the SOA registry 2, i.e. it defines that the registry object 20 may comprise, among others, certain types of properties and relationships to other registry objects. On the other hand, the application 1 may define different notions of properties and relationships, depending on the concrete implementation of the application 1. Therefore, the JAXR information model concepts are mapped onto related concepts of the application 1 by the invention.

In the following, the mapping concepts are first described in general terms and then illustrated by a concrete mapping of the JAXR notions onto notions of Java beans (see FIG. 3) used e.g. in CentraSite of applicant. CentraSite is a platform for SOA governance and lifecycle management for the development of SOA applications. It should however be appreciated that Java beans are only one of a wide variety of implementations for the application 1 and that the advantageous concepts of the present invention may be easily adapted to other programming languages. Accordingly, the present invention is not limited to a concrete product like CentraSite or the JAXR, but may as well be employed in other scenarios. Furthermore, although FIG. 2 only shows one exemplary registry object 20 and a corresponding application object 10, it should be appreciated that the present invention works for any number of objects in the SOA registry 2.

Mapping Registry Objects onto Application Objects

The determination of which application object 10 is a surrogate for which registry object 20 is done by a mapping 30 as shown in FIG. 2. The mapping 30 is defined on the type level, i.e. between an application object type 110 and a registry object type 220. Consequently, the application object 10, which is an instance of the application object type 110, serves as a kind of surrogate for the registry object 20, which is an instance of the registry object type 220.

The following code listing shows a concrete example of the mapping 30 using Java annotations:

```
@RegistryObject(objectTypeName =
    "{http://namespaces.CentraSite.com/csaf}Item")
public interface Item extends RegistryBean{
}
```

As can be seen, an interface definition of an interface Item (corresponding to the application object type 110) is annotated by an @RegistryObject annotation, which maps the Item interface onto a corresponding registry object type 220 (named {http://namespaces.CentraSite.com/csaf}Item) via the objectTypeName parameter in a declarative way.

Mapping Properties

The JAXR information model comprises at least three notions of properties of registry objects: JAXR object properties, JAXR object slots and properties of JAXR-defined object types (i.e. properties which are specific to JAXR-defined object types, as opposed to general properties of the general JAXR object type "RegistryEntry" such as "name" or "description"). JAXR object slots provide a dynamic way to add arbitrary attributes to a registry object at runtime, which enables extensibility within the information model. On the other hand, application objects like e.g. Java beans in an application may comprise bean properties and corresponding get- and set-operations to read and manipulate the bean properties.

FIG. 4 shows how the application object 10 in the application 1 comprises a property 100. The property 100 is mapped by the mapping 30 onto a corresponding property 200 comprised in the corresponding registry object 20 in the SOA registry 2. It should be appreciated that technically, properties are defined on the type-level (i.e. in the application object type 110) and instantiated on the object-level. In the following, only the object-level is described for the sake of simplicity.

Accordingly, standard JAXR registry object properties may be mapped to bean properties by a direct property-to-property mapping as shown below:

```
@Property
String getDescription( );
```

As can be seen, the bean property description (represented by its get-operation getDescription( )) of the application object 10 is mapped onto a corresponding JAXR registry object property. Since the @Property annotation is used without parameters, the bean property description may be mapped onto a JAXR registry object property with the same name by default. In case a JAXR registry object property with a different name is targeted, an annotation of the form @Propety (target="anotherRegistryObjectProperty") may be used accordingly.

Furthermore, JAXR object slots may be mapped to bean properties like in the following code listing:

```
@Slot(name = "{http://namespaces.CentraSite.com/csaf}shortName")
String getShortName( );
```

The JAXR 40 may only allow object slots to have string values. Java beans, however, may utilize a number of other property types like integer, boolean, date, calendar, etc. Therefore, the bean properties are preferably converted to string values.

Properties of JAXR-defined object types, i.e. JAXR registry object properties of certain JAXR-specific types (e.g. TelephoneNumber or PersonName defined by the JAXR standard) may be mapped onto bean properties using a dedicated annotation like depicted below:

```
@TelephoneNumbers
TelephoneNumbers getTelephone( );
```

Mapping Relationships

JAXR relationships between registry objects may be represented by three objects, e.g. a source registry object may be related to a target registry object through an association object. This notion is depicted in FIG. 5, where the registry object 20 is related to the registry object 21 through the association object 25.

On the other hand, the application 1 may know relationships represented by two objects, e.g. the application object 10 may be related to the application object 11 through an aggregation or dependency relationship 15, wherein the aggregation or dependency relationship 15 is not an object. In the context of a Java bean, an aggregation relationship may be represented by a get-operation of a bean property of the Java bean (which represents the application object 10), wherein the return value of the get-operation determines the target application object (the application object 11). The following code listing illustrates this aspect:

```
@Association(type = "HasAction", targetType = Action.class,
    mappedTo = MappedTo.ASSOCIATION_OBJECT )
List<Action> getActions( );
```

As can be seen, the bean property action (represented by its get-operation getActions( )) is mapped to the corresponding JAXR association object itself by setting the mappedTo parameter of the @Association annotation to the target object of the association. The type parameter determines the type of the association object (i.e. the JAXR concept which represents the association) and the targetType parameter indicates the type of the association target, i.e. the type of a bean which is the target of the association. In this example, the type of the bean is mapped to the association object. Alternatively, mappedTo=MappedTo.ASSOCIATION_TARGET could be used, in that the targetType parameter specifies the type of the bean mapped to the association target. Additionally, an @AssociationTarget annotation may be used within a bean that is mapped to an association, specifying that the property annotated with that annotation is mapped to the target object of the respective association. It should be appreciated that the above mapping addresses both the aggregation and dependency concept in the application domain. On an implementation level, there is no clear border between the two concepts, but the distinction is rather based on how a bean property is being handled by the application.

Furthermore, the JAXR information model may comprise a classification relationship, which classifies a registry object with a certain concept. To this end, the registry object 20 is related to the concept 22 through the classification object 26 in FIG. 5.

On the other hand, the application 1 may not know the concept of classifications. Therefore, as also shown in FIG. 5, the classification object 26 is mapped onto the aggregation or composition relationship 16 between the application objects 10 and 11. In the context of a Java bean, this may be achieved by @Classification and @ClassificationConcept annotations, as shown in the following code listing:

```
@Classification(classificationScheme="My Taxonomy",
    conceptPath="Root Concept/Concept/Subconcept",
    targetType=Subconcept.class)
List<Subconcept> getSubconcepts( );
@Classification(classificationScheme="My Taxonomy",
    conceptPath="Root Concept/Concept/Subconcept2")
Subconcept2 getSubconcept2( );
```

As can be seen from the exemplary listing above, the JAXR information model may comprise a notion called "taxonomy", which classifies or categorizes the objects of a SOA registry in a tree-like structure. In the JAXR information model, the root of a taxonomy tree is represented by a classification scheme and the child nodes of the taxonomy tree are represented by concepts. A classification of a registry object by one of the concepts then determines on which level of the taxonomy the registry object is classified. For example, a Geography classification scheme could provide a taxonomy system that defines a geography structure with continents, countries within continents, states (or provinces or internal subdivisions) within countries and cities and towns within states.

Accordingly, the above code listing indicates a mapping of subconcept application object properties onto all classifications where the JAXR concept is "Root Concept/Concept/Subconcept" in the taxonomy "My Taxonomy". Alternatively, the mapping could be applied on the concept itself by using a parameter mappedTo=MappedTo.TARGET_CONCEPT. There are various ways to filter the classifications which are being mapped to the property: concept path, concept key, parent path, or parent key. In the latter two cases, the concept parent may be specified. This is typically used if the classification selects an element from a pre-defined set of alternatives. Furthermore, the application object which is the target of the classification is specified using the targetType parameter. In the case of a single result object, there is no need to specify the target type, because the result type (getSubconcept2 in the above example) may be used as a default.

Furthermore, the @ClassificationConcept annotation may be used within beans that are mapped to classifications themselves in order to map a bean property to the underlying concept of this classification, as the following code listing shows:

```
@RegistryObject(objectTypeKey=Constants
    .OBJECT_TYPE_KEY_Classification)
public interface Finding extends RegistryBean {
    @ClassificationConcept
    public MyConceptBean getConceptBean( );
    ...
}
```

Mapping Inheritance

The example in FIG. 6 shows a taxonomy 29 of the SOA registry 2, wherein the registry object 20 is classified (by the classification 27) as a classification scheme 50 located at the root of the taxonomy 29 and the registry object 21 is classified (by the classification 28) as a child concept 51 of the taxonomy 29.

On the other hand, an application may not know the concept of taxonomies, but provide the concept of inheritance between application objects (or application object types, respectively). FIG. 6 shows how the application 10 is related to the application object 11 through the inheritance relationship 17. On the programming language level, this would mean that the application object type corresponding to the application object 11 is a subtype of the application object type 110, inheriting all its properties and relationships, i.e. the types build a type hierarchy.

As shown in FIG. 6, the mapping between a taxonomy and a type hierarchy may be achieved in that the application objects 10 and 11 are each mapped onto the registry objects 20 and 21 depending on their level inside the taxonomy 29 and the inheritance hierarchy, respectively. In the context of a Java bean, the following code listing shows how this mapping 30 may be defined by Java annotations:

```
@RegistryObject(objectTypeName =
    "{http://namespaces.CentraSite.com/csaf}Action")
@ClassifiedInstances(
    instances = {
        @ClassifiedInstance(
            classificationScheme = "CSAF-Taxonomy",
            conceptPath = "/ClassificationInstances/
                ActionTypes/Action1",
            beanType = Action1.class),
        @ClassifiedInstance(
            classificationScheme = "CSAF-Taxonomy",
            conceptPath = "/ClassificationInstances/
```

```
        ActionTypes/Action2",
    beanType = Action2.class)
   }
 )
 public interface Action extends RegistryBean {  }
 @RegistryObject(objectTypeName =
     "{http://namespaces.CentraSite.com/csaf}Action")
 public interface Action1 extends Action {
    @ClassifiedInstanceProperty
    @Slot(name = "{http://namespaces.CentraSite.com/
         csaf}customerProject")
    String getCustomerProject( );
 }
```

As can be seen, the application object type for the application object 11 (the interface Action1) is a subtype of the application object type 110 (interface Action), determined by the extends keyword. Furthermore, the interface Action is mapped onto the corresponding registry object type "{http://namespaces.CentraSite.com/csaf}Action by the @RegistryObject annotation, as already described above. Furthermore, the annotation @ClassifiedInstances of the interface Action describes how the taxonomy 29 is mapped to the class hierarchy of beans (formed by Action and Action1), in that it comprises two @ClassifiedInstance annotations, which specify a mapping of a concept from the taxonomy to a bean from the bean class hierarchy. The subtype Action1 further comprises an annotation @ClassifiedInstanceProperty, for accessing properties represented as part of the type specific classification object. The classificationScheme parameter specifies the name of the classification scheme to which the concept used for classifying this registry object belongs (a classification scheme identifies a taxonomy, as explained above). The conceptPath parameter uniquely identifies a concept within the taxonomy. Lastly, the BeanType parameter specifies the type of bean to be instantiated and mapped to the underlying JAXR registry object.

Usage Scenario of the Method

By utilizing one or more of the above described mapping concepts, an application 1 may efficiently manipulate the registry object 20 through a corresponding application object 10. For example the task of creating a new registry object of a custom type and setting its name property may be efficiently achieved by using the method of the present invention, as the following code listing illustrates:

```
BeanPool pool = context.getBeanPool( );
Application app = pool.create(Application.class);
app.setName("My Application Number Demo Test 2");
pool.update(app)
```

As can be seen, the application 1 is provided with an application object 10 app, which is an instance of the application object type 110 Application. The application 1 then sets the name property of the application object 10 by invoking the corresponding setName( ) operation. The mapping 30 of the application object type 110 onto the corresponding registry object type 220 as well as the mapping 30 of the name property is achieved by the following annotated type definition of the application object type 110 (Application), as already explained above:

```
@RegistryObject (objectTypeName =
    BeanPoolExample.OBJ_TYPE_APPLICATION)
public interface Application extends RegistryBean{
   @Property
   public String getName( );
   public void setName(String name);
}
```

As can be seen, the application object type 110 (Application) is mapped onto the corresponding registry object type 220 via the @RegistryObject annotation and the name property 100 (getName( )) is mapped onto the corresponding object property 200 of the registry object type 220 (and the registry object 20) via the @Property annotation.

Figure 10:
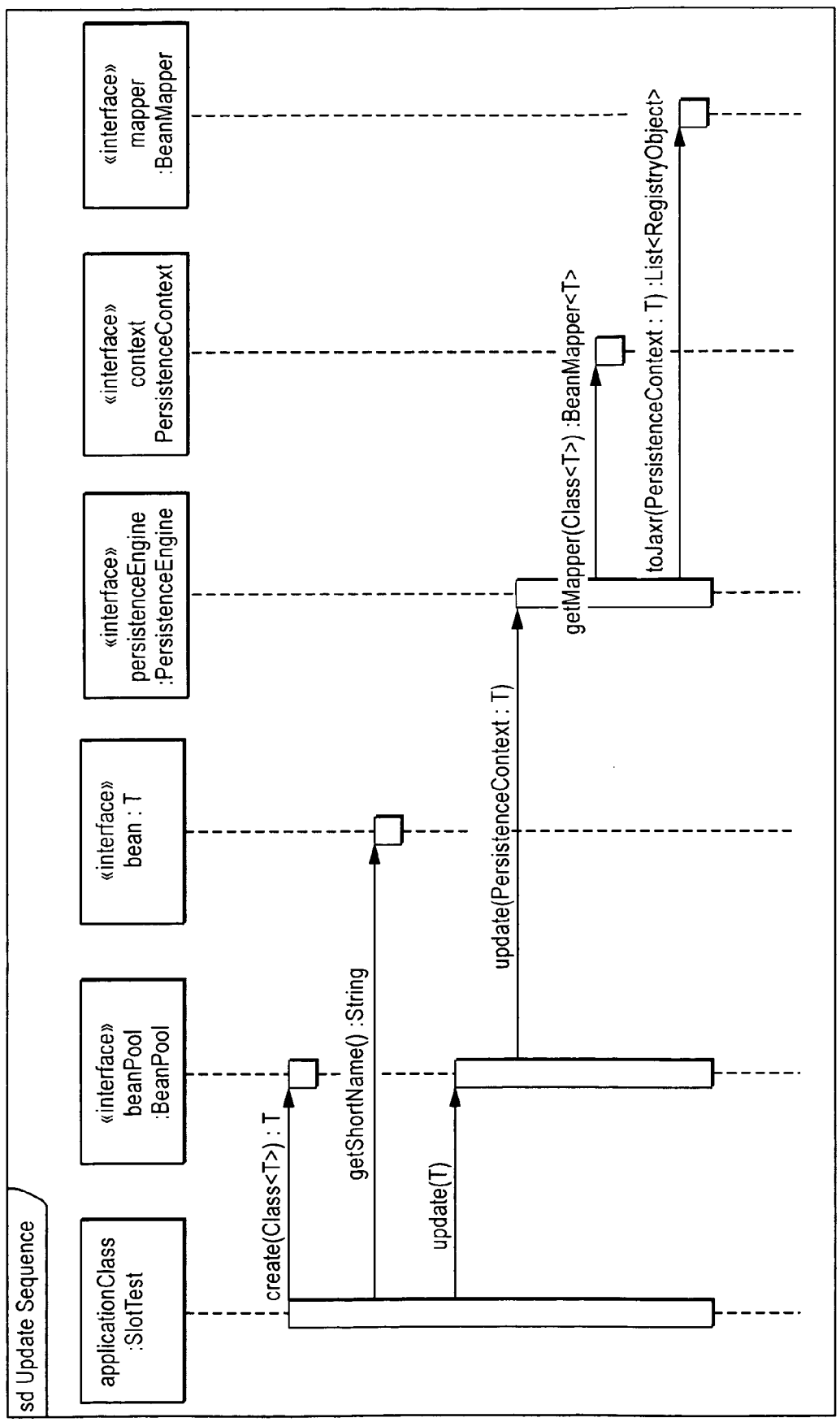

In order to process the above defined mappings, the method of the present invention is preferably unplemented in a computer program in the sense of a framework. An exemplary framework may e.g. comprise a BeanPool which manages the life cycle of the beans in a session, e.g. it creates beans requested by the application 1. It may also serve as a session bean cache. Furthermore, it may provide CRUD interfaces (create, read, update, delete) and various find-operations for beans. A Beans-to-JAXR-Mapper may process the above described mapping between beans and JAXR registry objects, in that it parses the Java annotations defining the mappings when being invoked by the BeanPool. Finally, a Registry-Acessor may encapsulate the JAXR operations and may be adapted for being used by the Mapper classes. An exemplary sequence diagram illustrating the interworking of the above described framework components when creating and updating a bean is shown in FIG. 10.

The above described beans are a central point in the architecture of the exemplary framework. They preferably comprise only data without processing logic. In the exemplary framework, beans need to extend a provided base class, i.e. they need to implement the RegistryBean interface and extend its default implementation DynamicRegistryBean. The beans may follow more or less the ValueObject and Data Transfer Object design patterns in order to encapsulate data and transport it through the layers of an application. A typical example of such application layers is a presentation layer, a business logic layer and a data layer, which is a commonly used architecture for modern applications. The presentation layer may handle the visualization of the application to the user. The business logic may encapsulate all business rules within the application. Finally, the data layer may take care of retrieving and storing data in the SOA registry. All layers need to interact in order to provide the functionality of the application, normally the presentation logic with the business logic and the business logic with the data layer. Information between the layers may in this case be transferred in the form of beans, i.e. the beans are "travelling" through the layers.

The class diagram in FIG. 7 outlines the main classes which comprise the base hierarchy of the beans in the exemplary framework. The main interface is the RegistryBean. FIG. 7 shows two implementations, AbstractRegistryBean, which is an abstract class and DynamicRegistryBean, which is a concrete implementation. These classes may be used by an application to facilitate the implementation of the application beans. The only restriction imposed on the application beans is that they have to extend the RegistryBean interface.

As already explained above, the mapping between beans and JAXR notion's hides the complexity of the JAXR by providing, in the exemplary framework, the mechanism of mapping beans to JAXR registry objects using mapping rules declared as Java annotations. The class diagram in FIG. 8 outlines the main classes and interfaces of a mapper (which processes the mapping rules) in the exemplary framework. As can be seen, the two main interfaces are the BeanMapper and the PropertyMapper. The former takes care of mapping a bean to a registry object, the latter maps a bean property to a JAXR registry object property, slot, association, classification, etc. as already described above. To this end, both interfaces define two methods, toJaxr( ) and toBean( ), which handle the mapping in both directions correspondingly. The further classes in FIG. 8 show concrete implementations of these interfaces, e.g. SlotMapper is a PropertyMapper taking care of mapping a bean property to a slot. DefaultBeanMapper is the default implementation of the BeanMapper to map a bean (RegistryBean) to a JAXR registry object.

Furthermore, CustomMapper and AnotherCustomMapper in FIG. 8 depict application-specific mappers that implement custom mappings. This illustrates an especially advantageous feature of the present invention, namely its extensibility mechanism. For example an application may introduce own annotations and corresponding mapping rules and can configure the framework to instantiate and use the custom mappers when a bean is being annotated with the custom annotations. FIG. 9 shows an overview of the annotation types described above, which are implemented in the exemplary framework.

A framework according to the method of the present invention as illustrated above may offer a number of further features, which are explained in the following.

In certain cases where a bean has references to a significant amount of other beans (through its properties and relationships), a huge amount of data may be required when loading the bean into the memory of the application. Therefore, the framework may not load the relationships and properties of a bean until they are actually requested by the application. In the context of the framework, this concept may be implemented transparently and relatively independent from the other functionality (except the mappers and the bean pool) by using the proxy pattern. The BeanPool then may have the responsibility to attach a proxy class to a bean which will load the data when the corresponding get-operation is invoked.

Furthermore, it may be desirable that the framework works in scenarios where multiple users access the same resources concurrently. To minimize the complexity, the framework may therefore rely on and use functionality provided by the underlying JAXR layer, e.g. transactional support, locking, thread safety etc.

The invention claimed is:

1. A method for manipulating at least one JAXR registry object that is associated with a SOA registry by an application, the at least one JAXR registry object being accessible through a Java API for XML registries (JAXR), the method comprising:
   defining a mapping between at least one JAXR registry object type and at least one application object type, wherein the mapping is based on at least one Java annotation that is associated with the at least one application object type;
   instantiating the at least one application object type to provide the application with at least one application object;
   parsing the at least one Java annotation;
   associating the at least one application object to at least one JAXR registry object of the at least one JAXR registry object type the association between the at least one application object and the JAXR object formed based on the parsed at least one Java annotation; and
   manipulating the at least one application object through the application, the association between the at least one application object and the at least one JAXR registry object causing a related manipulation of the at least one JAXR registry object through the JAXR based on the defined mapping, the related manipulation interfacing with the SOA registry.

2. The method of claim 1, wherein the at least one JAXR registry object comprises at least one property and wherein the mapping comprises a mapping of the at least one property onto at least one property of the corresponding application object.

3. The method of claim 2, wherein the at least one property of the at least one JAXR registry object can hold at least one string value and wherein the mapping onto the at least one property of the corresponding application object comprises a conversion to a string value.

4. The method of claim 1, wherein the at least one JAXR registry object is related to at least one second registry object by one or more association objects and the at least one application object is related to at least one second application object by one or more aggregation and/or dependency relationships and wherein the mapping comprises a mapping of the one or more association objects onto the one or more aggregation and/or dependency relationships.

5. The method of claim 1, wherein the at least one JAXR registry object is related to at least one concept of the SOA registry by one or more classification objects and the at least one application object is related to at least one second application object by one or more aggregation and/or composition relationships and wherein the mapping comprises a mapping of the one or more classification objects onto the one or more aggregation and/or composition relationships.

6. The method of claim 1, wherein the at least one JAXR registry object is related to at least one classification scheme by one or more classification objects, the at least one classification scheme defining at least one taxonomy in the SOA registry and wherein the mapping comprises a mapping of the at least one JAXR registry object onto the corresponding at least one application object.

7. The method of claim 6, wherein at least one second registry object is related to at least one concept by one or more classification objects the at least one concept being a child concept in the at least one taxonomy, wherein at least one second application object is related to the at least one application object by an inheritance relationship and wherein the mapping comprises a mapping of the at least one second registry object onto the at least one second application object.

8. The method of claim 1, further comprising creating, in the SOA registry, the at least one JAXR registry object corresponding to the at least one application object.

9. The method of claim 1, further comprising querying the SOA registry for the at least one JAXR registry object corresponding to the at least one application object.

10. The method of claim 1, wherein the definition of the mapping is based on a set of pre-defined mapping rules and wherein the method comprises the further step of defining at least one new mapping rule.

11. The method of claim 1, wherein the at least one application object is adapted for loading a property or a relationship only when the property or the relationship is accessed by the at least one application.

12. The method of claim 1, wherein the at least one application object is a Java Bean and the application object type is an interface definition of a Java Bean.

13. A non-transitory computer readable storage medium including stored instructions for interfacing with at least one registry object of a SOA registry by an application, the at least one registry object being accessible through a Java API for XML registries (JAXR), the stored instructions comprising instructions that are configured to:

establish a mapping between at least one JAXR registry object type and at least one application object type, wherein the mapping is based on at least one Java annotation that is associated with the at least one application object type;

instantiate the at least one application object type to provide the application with at least one application object;

parse the at least one Java annotation;

associate the at least one application object to at least one JAXR registry object of the at least one JAXR registry object type, the association between the at least one application object and the JAXR object based on the parsed at least one Java annotation; and manipulate the at least one application object through the application, the association between the at least one application object and the at least one JAXR registry object causing a related manipulation of the at least one JAXR registry object through the JAXR based on the defined mapping, the related manipulation interfacing with the SOA registry.

\* \* \* \* \*